Patented Mar. 15, 1927.

1,621,119

UNITED STATES PATENT OFFICE.

WINFORD P. LARSON, OF MINNEAPOLIS, MINNESOTA.

SCARLET FEVER ANTIGEN.

No Drawing. Application filed January 27, 1926, Serial No. 84,168. Renewed November 26, 1926.

It is the object of my invention to modify scarlet fever streptococci, (hemolytic streptococci,) their products and toxin, so that they may be used as antigens to immunize against scarlet fever, and may do so without requiring the relatively larger number of graduated injections required with the present type of scarlet fever toxin.

This application is in part a continuation of my co-pending application Serial No. 52,963, filed August 27, 1925.

Scarlet fever toxin has been produced from the scarlet fever streptococci, and has been used as an antigen to immunize against scarlet fever. Moreover, the scarlet fever streptococci themselves have been used as antigens to cause the production of antibody serum; and this has been done both with living and dead streptococci.

However, prior to my invention, in producing immunization with the unmodified scarlet fever streptococci, living or dead, and/or their products or toxins, it has been necessary to give a series of injections, ordinarily ranging from 3 to 10, of successively increasing size; the first dose being ordinarily fairly small, and succeeding doses being larger as immunity is gradually created. This requires a rather long period of time, and considerable inconvenience.

By modifying the scarlet fever streptococci, their products or toxins, in accordance with my invention, I am able to give a patient a relatively large injection, of sufficient size so that immunity may ordinarily be obtained from a single injection.

I have discovered that the scarlet fever streptococci, or their products or toxin, or both, may be attenuated to lower very greatly the peak toxicity thereof, probably with a longer duration of the toxic action and a wider area of action in the body, by treating the streptococci, their products or toxins, or both, with a suitable agent which produces such reduction in peak toxicity while leaving the material antigenic. I have discovered that this is the case whether the streptococci are living organisms, or are dead organisms; and that it may be done on the toxin alone, on the organisms alone, whether living or dead, or on the mixture of the living or dead organisms with the toxins thereof. The treatment of the scarlet fever organisms, their products or toxins, is desirably sufficient to reduce the peak toxicity to a point where a dose as large as a plurality of normal first immunizing doses may be injected without greater discomfort or greater ill effects than such a normal first dose has, while maintaining such treated material sufficiently antigenic to incite the production of immunity against scarlet fever in the inoculated person.

The scarlet fever streptococci, or their products or toxins, or both, are attenuated or detoxified by treating them with a soluble salt of one of the higher fatty acids, which salts are commonly designated as soaps and are all surface-tension depressants, (or capillary active substances, the two terms being synonymous,) or with a soluble salt of some other organic acid which is a surface-tension depressant. The salts I prefer to employ are derived from fatty acids having melting points below 44° C. and are soluble in water at that or a lower temperature. Of these, I prefer the salts derived from unsaturated fatty acids, particularly those having one or more hydroxyl groups, such as a soluble salt of ricinoleic acid, and especially purified castor oil soap. I prefer to work with the castor oil soap solution at pH of 7.4 to 8.0, within which pH range the desired attenuating effect is at a maximum. The treatment with the castor oil soap may be of the living scarlet fever streptococci, or of the dead scarlet fever streptococci, (killed in any manner, as by heat or by a bactericide,) or of the products or toxin obtained from such streptococci, or of a mixture of the streptococci (living or dead) and the products or toxins produced thereby. I prefer to use either the toxin itself, free from the organisms, as the basis for the treatment; or else to use a vaccine consisting of dead streptococci mixed with the toxin produced thereby while they were living, as the basis for the treatment with the castor oil soap.

The concentration of the castor oil soap solution after mixture therewith of the scarlet fever streptococci, their products or toxins, may vary considerably. In my experience, this concentration should be between 0.1% and 20%, and is desirably about 1% to 2%, after such mixture. The weaker the soap solution is in such mixture, the larger the volume of the soap solution should be for a given quantity of the streptococci, their products or toxins; and, conversely, the smaller the volume of soap solution used, the greater should be its concentration. I prefer to use the soap solution in such concentration that the volume to be injected of the mixture of the soap with the streptococci or their products or toxin, or with both, should not exceed 2 c. c.; but this is merely for convenience in injection.

The mixture is allowed to stand at least a sufficient time to permit it to reach equilibrium before it is injected; which time varies with the concentration of the soap solution, in inverse sense to such concentration. The surface-tension depressant, such as the castor oil soap, renders the scarlet fever streptococci, their products or toxins, sufficiently non-poisonous so that the dose may be increased many fold; yet the streptococci, their products or toxins, retain their stimulating power as an antigen, so that they incite in the inoculated person the production of scarlet fever anti-toxin or anti-bacterial bodies, which serve to immunize against the disease.

The action on the modified streptococci, their products or toxins, in the human body, is due to an adsorption action, probably of the fatty-acid salt on the bacterial organisms or on the toxin molecules, or on both, so that upon injection the antigen is at first partially or entirely restrained from exerting its poisonous action, which would otherwise cause a serious reaction, or even death if the dose were of sufficient size. My experience indicates that following the injection the antigen is slowly released from this adsorbed fatty-acid salt, so that the antigen has its effect spread out over a relatively longer period of time instead of being suddenly effective, and the resultant longer-continued stimulation on the body of the inoculated person causes a building up of resistance by rapidly and continuously creating the corresponding anti-bodies throughout such longer-continued period of stimulation following the injection of the modified bacterial organisms and/or modified toxin.

My experience also furnishes evidence that the fatty-acid salt, perhaps by its capacity to dialyze, promotes penetration of the antigen (toxin or bacterial organisms) mixed with it into the body tissues, so that such antigen is more widely distributed through the body and thus exerts its antigenic or stimulatory action over a wider area; with a maintenance of the stimulating effect per unit of area below a critical maximum beyond which ill effects and a less proportionate production of anti-bodies occur, and with a greater and more rapid total production of anti-bodies because of the increase in area of the stimulation.

With the use of my modified scarlet fever antigen, I may give as the first injection—which is ordinarily the only injection required—a dose which is from 25 to 100 fold the normal first dose of unmodified antigen. This injection may be made in the usual manner, ordinarily subcutaneously, or intramuscularly if desired. This greatly increased dose is found to produce less discomfort than the ordinary first dose of much smaller size of the unmodified toxin; and a single dose of my modified antigen of the size indicated above usually produces scarlet fever immunity.

If desired, the antigen and the fatty-acid salts may be dispensed in separate vials, of suitably proportioned size; so that the physician may himself mix the contents of the two vials a suitable time prior to injection.

In the following claims, in defining one of the components of the mixture, I use the expression "scarlet fever streptococci, and/or their products or toxins," to denote either the scarlet fever streptococci alone, whether living or dead, or the products or toxins alone of said scarlet fever streptococci, or a mixture of such scarlet fever streptococci (living or dead) and the products or toxins produced thereby.

I claim as my invention:

1. A composition of matter, comprising a mixture of scarlet fever streptococci, and/or their products or toxins, and a soluble salt of an organic acid which is a surface-tension depressant.

2. A composition of matter, comprising a mixture of scarlet fever streptococci, and/or their products or toxins, and a surface-tension depressant comprising a soluble salt of a higher fatty acid.

3. A composition of matter, comprising a mixture of scarlet fever streptococci, and/or their products or toxins, and a surface-tension depressant comprising a soluble salt of a higher unsaturated fatty acid.

4. A composition of matter, comprising a mixture of scarlet fever streptococci, and/or their products or toxins, and a surface-tension depressant comprising a soluble salt of a higher fatty acid containing one or more hydroxyl groups.

5. A composition of matter, comprising a mixture of scarlet fever streptococci, and/or their products or toxins, and a surface-tension depressant comprising a soluble salt of a higher unsaturated fatty acid containing one or more hydroxyl groups.

6. A composition of matter, comprising a mixture of scarlet fever streptococci, and/or their products or toxins, and a soluble salt of recinoleic acid.

7. A composition of matter, comprising a mixture of scarlet fever streptococci, and/or their products or toxins, and castor oil soap.

In witness whereof, I have hereunto set my hand this 25th day of January, 1926.

WINFORD P. LARSON.